United States Patent
Hwang et al.

(10) Patent No.: US 12,132,762 B2
(45) Date of Patent: Oct. 29, 2024

(54) ELECTRONIC DEVICE AND METHOD FOR DETECTING MALICIOUS SERVER

(71) Applicant: S2W INC., Seongnam-si (KR)

(72) Inventors: In Wook Hwang, Seongnam-si (KR); Chang Hoon Yoon, Seongnam-si (KR)

(73) Assignee: S2W INC., Seongnam-si (KR)

( * ) Notice: Subject to any disclaimer, the term of this patent is extended or adjusted under 35 U.S.C. 154(b) by 0 days.

(21) Appl. No.: 18/526,827

(22) Filed: Dec. 1, 2023

(65) Prior Publication Data
US 2024/0187451 A1 Jun. 6, 2024

(30) Foreign Application Priority Data
Dec. 5, 2022 (KR) .................. 10-2022-0167625

(51) Int. Cl.
*H04L 9/40* (2022.01)
*G06F 16/955* (2019.01)
*H04L 69/16* (2022.01)
*H04L 69/22* (2022.01)

(52) U.S. Cl.
CPC ...... *H04L 63/1483* (2013.01); *G06F 16/9566* (2019.01); *H04L 69/16* (2013.01); *H04L 69/22* (2013.01)

(58) Field of Classification Search
CPC ..... H04L 63/1483; H04L 69/16; H04L 69/22; G06F 16/9566
See application file for complete search history.

(56) References Cited

U.S. PATENT DOCUMENTS

| 9,621,576 B1 * | 4/2017 | Oprea ............... H04L 67/30 |
| 10,038,703 B2 * | 7/2018 | Liu ................... H04L 63/1425 |
| 2019/0297092 A1 * | 9/2019 | Shibahara ........... H04L 63/168 |
| 2021/0409445 A1 * | 12/2021 | Nambirajan ............ G06N 3/02 |

FOREIGN PATENT DOCUMENTS

| KR | 10-2318991 B1 | 10/2021 |
| KR | 10-2022-0158533 A | 12/2022 |

OTHER PUBLICATIONS

Office Action for Korean Patent Application No. 10-2022-0167625 dated May 30, 2023.

* cited by examiner

*Primary Examiner* — Abiy Getachew
(74) *Attorney, Agent, or Firm* — Sughrue Mion, PLLC (57) ABSTRACT

Provided are an electronic device and method for detecting a malicious server. The method includes acquiring first feature information of a server Internet protocol (IP) of a malicious website, acquiring second feature information of a server IP of a comparative website, comparing the first feature information with the second feature information, and determining that the malicious website has been changed to the comparative website on the basis of the comparison result.

8 Claims, 8 Drawing Sheets

```
[X] | Headers | Preview | Response | Cookies | Timing |

Request URL: http://localhost/drupal-7/user
Request Method: GET
Status Code: ● 200 OK
▲ Request Headers (10)
▼ Response Headers                view source
  Cache-Control: no-cache, must-revalidate, post-check=0, pre-check=0
  Connection: Keep-Alive
  Content-Language: en
  Content-Type: text/html; charset=utf-8
  Date: Thu, 17 Oct 2013 10:43:04 GMT
  ETag: "1382006584"
  Expires: Thu, 17 Oct 2013 10:53:04 +0000
  Keep-Alive: timeout=5, max=100
  Last-Modified: Thu, 17 Oct 2013 10:43:04 +0000
  Server: Apache/2.2.23 (Unix) mod_ssl/2.2.23 OpenSSL/0.9.8y DAV/2 PHP/5.4.10
  Transfer-Encoding: chunked
  X-Frame-Options: SAMEORIGIN
  X-Generator: Drupal 7 (http://drupal.org)
  X-Powered-By: PHP/5.4.10
```

SECOND FEATURE INFORMATION (brace encompassing Cache-Control through Server lines)

FIG. 4

| CLASSIFICATION | FEATURE | SERVER IP 1 | SERVER IP 2 |
|---|---|---|---|
| TCP | TCP open port<br>TCP open service | 22 (ftp)<br>443 (https)<br>8000 (http)<br>9500 (unknown) | 23 (ssh)<br>80 (http) |
| UDP | UDP open port | 200, 300 | 8000 |
| ICMP | ICMP RESPONSE PRESENCE OR ABSENCE | Yes | No |
| | TTL (ROUND UP) | 64 | |
| FTP | FTP version | | |
| | ACCESS message | | "Hellow" |
| HTTP | version | 1.1 | 1.1 |
| | server type | Apache | Apache |
| | cache-control | | |
| HTTPS | TLS version | 1.2 | |
| SSH | SSH version | V2 | V2 |
| | MESSAGE IN CASE OF ACCESS | "HELLO" | |

ELECTRONIC DEVICE AND METHOD FOR DETECTING MALICIOUS SERVER

CROSS-REFERENCE TO RELATED APPLICATION

This application claims priority to and the benefit of Korean Patent Application No. 10-2022-0167625, filed on Dec. 5, 2022, the disclosure of which is incorporated herein by reference in its entirety.

BACKGROUND

1. Field of the Invention

The present disclosure relates to a technology for detecting a malicious website, and more particularly, to a technology for automatically determining a malicious website using features of a server.

2. Discussion of Related Art

As cybercrime methods, such as transaction fraud, phishing, copying and sharing of copyrighted works, sharing of pornography, and more, become more sophisticated, a technology for detecting websites used for cybercrime is attracting attention.

In general, servers and harmful websites that are used as resources for cybercrime, such as transaction fraud, phishing, copying and sharing of copyrighted works, sharing of pornography, and more, tend to respond to Internet protocol (IP) blocking or criminal tracking by continuously changing their IPs or uniform resource locators (URLs). Specifically, when previously used IPs or URLs are blocked, malicious websites tend to be used for cybercrime again by changing only IPs or URLs of the servers. Blocking or tracking these relies on reporting on IPs or URLs of new servers or manual work by a responsible management agency.

Therefore, it is necessary to develop a method of detecting a malicious website to automatically detect a malicious website and a device for performing the method.

SUMMARY OF THE INVENTION

The present disclosure is directed to providing a method of detecting a malicious server using feature information of a server of a malicious website and a device for performing the method.

Technical problems to be achieved the present disclosure are not limited to that described above, and other technical problems which have not been described will be clearly understood by those skilled in the technical field to which the present disclosure pertains from the present specification and the accompanying drawings.

According to an aspect of the present disclosure, there is provided a method of detecting a malicious server, the method including acquiring first feature information of a server IP of a malicious website, acquiring second feature information of a server IP of a comparative website from a response packet of the comparative website, comparing the first feature information with the second feature information, and determining that the malicious website has been changed to the comparative website on the basis of a comparison result. The determining that the malicious website has been changed to the comparative website includes calculating similarities between same types of protocol information included in the first feature information and the second feature information, calculating an add-up similarity by giving weights to the calculated similarities according to the types of protocol information, wherein a smaller weight is given to protocol information that is more likely to be dropped in a process of transmitting the response packet to calculate the add-up similarity, and determining that the malicious website has been changed to the comparative website when the add-up similarity is larger than a predetermined value.

According to another aspect of the present disclosure, there is provided an electronic device including a processor configured to acquire first feature information of a server IP of a malicious website, acquire second feature information of a server IP of a comparative website from a response packet of the comparative website, compare the first feature information with the second feature information, and determine that the malicious website has been changed to the comparative website on the basis of a comparison result. The processor configured to calculate similarities between same types of protocol information included in the first feature information and the second feature information, calculate an add-up similarity by giving weights to the calculated similarities according to the types of protocol information wherein a smaller weight is given to protocol information that is more likely to be dropped in a process of transmitting the response packet to calculate the add-up similarity, and determine that the malicious website has been changed to the comparative website when the add-up similarity is larger than a predetermined value.

Solutions of the present disclosure are not limited to those described above, and other solutions which have not been described will be clearly understood by those skilled in the technical field to which the present disclosure pertains from the present specification and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The foregoing objects, features, and advantages of the present disclosure will become apparent through the following detailed description associated with the accompanying drawings. However, the present disclosure may be modified in various ways and have a variety of embodiments, and specific embodiments will be illustrated in the drawings and described in detail.

Throughout the specification, like reference numerals refer to like components in principle. Also, components having the same function within the same spirit will be described using the same reference numeral, and overlapping description thereof will be omitted.

When it is determined that a detailed description of a well-known function or component associated with the present disclosure may unnecessarily obscure the gist of the present disclosure, the detailed description will be omitted. Also, numbers (e.g., first, second, and the like) used in the process of describing the present specification are merely identifiers for distinguishing one component from others.

The suffixes "module" and "part" for components used in embodiments below are assigned or mixed in consideration of only easiness in writing the specification and do not have distinctive meanings or roles.

In embodiments below, singular expressions include plural expressions unless the context clearly indicates otherwise.

In embodiments below, the terms "include," "have," and the like indicate the presence of a feature or component described in the specification and do not preclude the possibility that one or more other features or components will be added.

In the drawings, the sizes of components may be exaggerated or reduced for convenience of description. For example, the size and thickness of each component shown in the drawings are arbitrarily shown for convenience description, and the present disclosure is not necessarily limited to those illustrated.

When an embodiment can be implemented in a different manner, a specific process may be performed in a different order from that described below. For example, two processes which are consecutively described may be performed substantially at the same time or performed in an order opposite to a described order.

In embodiments below, when it is described that components and the like are connected, the components may be directly connected or indirectly connected with other components interposed therebetween.

For example, when it is described in the present specification that components and the like are electrically connected, the components and the like may be directly electrically connected or indirectly electrically connected with other components and the like interposed therebetween.

A method of detecting a malicious server may include an operation of acquiring first feature information of a server Internet protocol (IP) of a malicious website, an operation of acquiring second feature information of a server IP of a comparative website from a response packet of the comparative website, an operation of comparing the first feature information with the second feature information, and an operation of determining that the malicious website has been changed to the comparative website on the basis of the comparison result. The operation of determining that the malicious website has been changed to the comparative website may include an operation of calculating similarities between same types of protocol information included in the first feature information and the second feature information, an operation of calculating an add-up similarity by giving weights to the calculated similarities according to the types of protocol information, wherein a smaller weight is given to protocol information that is more likely to be dropped in a process of transmitting the response packet to calculate the add-up similarity, and an operation of determining that the malicious website has been changed to the comparative website when the add-up similarity is larger than a predetermined value.

According to an exemplary embodiment of the present disclosure, the operation of determining that the malicious website has been changed to the comparative website may further include an operation of calculating a similarity between the first feature information and the second feature information and an operation of determining the comparative website as a candidate website that is likely to be a modified website of the malicious website when the calculated similarity is larger than a predetermined value.

According to an exemplary embodiment of the present disclosure, the protocol information may include at least one of user datagram protocol (UDP) information, Internet control message protocol (ICMP) information, file transfer protocol (FTP) information, hypertext transfer protocol (HTTP) information, hypertext transfer protocol over secure socket layer (HTTPS) information, and secure shell (SSH) protocol information.

According to an exemplary embodiment of the present disclosure, the operation of determining that the malicious website has been changed to the comparative website may further include an operation of acquiring uniform resource locator (URL) information of the malicious website, an operation of acquiring URL information of the comparative website, an operation of calculating a URL distance between the URL information of the malicious website and the URL information of the comparative website by calculating an edit distance, and an operation of determining that the malicious website has been changed to the comparative website on the basis of the comparison result between the first feature information and the second feature information and the URL distance.

According to an exemplary embodiment of the present disclosure, the first feature information and the second feature information may be about at least one of an open network port of a server, a version of the open network port, and a setting value of the open network port.

According to an exemplary embodiment of the present disclosure, the acquiring of the second feature information of the server IP of the comparative website may include an operation of acquiring the response packet of the comparative website, an operation of identifying a header of the response packet, and an operation of acquiring the second feature information from data corresponding to the identified header through a parsing technique.

According to an exemplary embodiment of the present disclosure, a computer-readable recording medium on which a program for executing the method is recorded may be provided.

An electronic device according to an exemplary embodiment of the present disclosure may include a processor configured to acquire first feature information of a server IP of a malicious website, acquire second feature information of a server IP of a comparative website from a response packet of the comparative website, compare the first feature information with the second feature information, and determine that the malicious website has been changed to the comparative website on the basis of the comparison result. The processor may be configured to calculate similarities between same types of protocol information included in the first feature information and the second feature information, calculate an add-up similarity by giving weights to the calculated similarities according to the types of protocol information, that is, by giving a smaller weight to protocol information that is more likely to be dropped in the process of transmitting the response packet to calculate the add-up similarity, and determine that the malicious website has been changed to the comparative website when the add-up similarity is larger than a predetermined value.

Hereinafter, a method of detecting a malicious server and an electronic device (or server) for performing the method (hereinafter, "electronic device") according to exemplary embodiments of the present disclosure will be described with reference to FIGS. 1 to 8.

Figure 1:
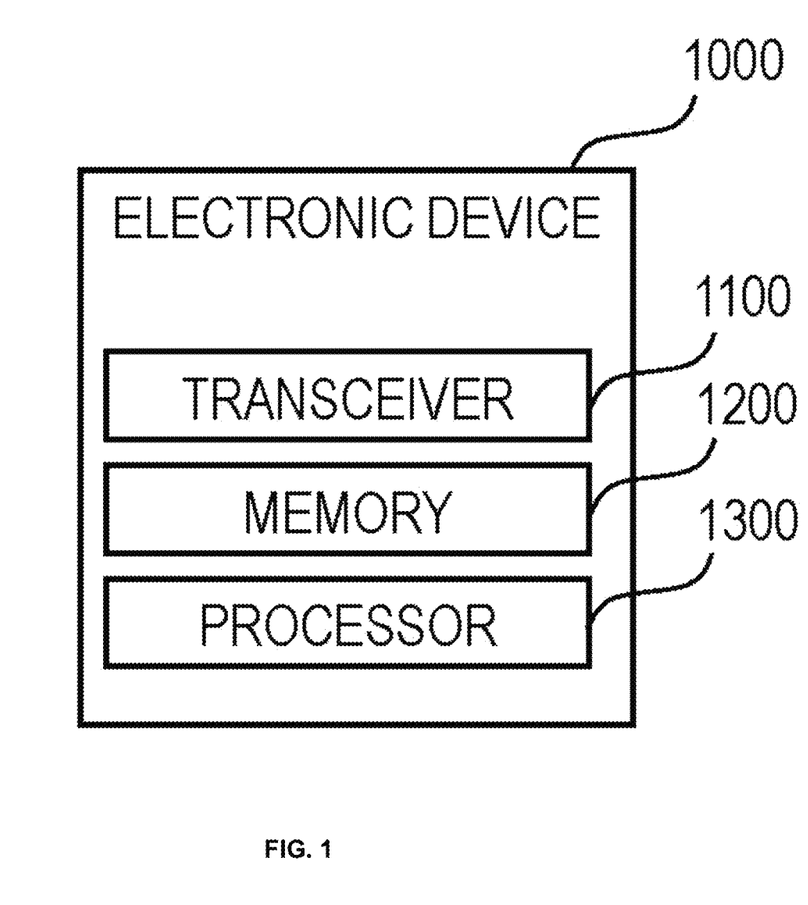
FIG. 1 is a block diagram of an electronic device according to an exemplary embodiment of the present disclosure.

FIG. 1 is a block diagram of an electronic device 1000 according to an exemplary embodiment of the present disclosure.

The electronic device 1000 according to the exemplary embodiment of the present disclosure may include a transceiver 1100, a memory 1200, and a processor 1300.

The transceiver 1100 of the electronic device 1000 may communicate with any external device or external server. As an example, the electronic device 1000 may transmit data for requesting a response to an external server through the transceiver 1100 and receive a response (e.g., a response packet) from the external server. For example, through Packet Internet Groper, the electronic device 1000 may transmit data for requesting a response to an external server corresponding to random URL or random IP and receive a response packet from the external server.

As an example, the electronic device 1000 may acquire feature information of a malicious website through the transceiver 1100. For example, the electronic device 1000 may acquire feature information of a malicious website previously stored in a database (DB) through the transceiver 1100.

The electronic device 1000 may access a network through the transceiver 1100 and transmit or receive various types of data. The transceiver 1100 may be of a wired or wireless type. Since the wired type and wireless type of transceivers have their own advantages and disadvantages, both the wired type of transceiver and the wireless type of transceiver may be provided in the electronic device 1000 in some cases. In the case of the wireless type of transceiver, a wireless local area network (WLAN) communication method, such as Wi-Fi, may be mainly used. Alternatively, in the case of the wireless type of transceiver, cellular communication, such as Long-Term Evolution (LTE) or Fifth Generation (5G), may be used. However, the wireless communication protocol is not limited to the foregoing examples, and any appropriate wireless communication method may be used. In the case of the wired type of transceiver, LAN or Universal Serial Bus (USB) communication may be representatively used, and other methods are also available.

The memory 1200 of the electronic device 1000 may store various types of information. In the memory 1200, various types of data may be stored temporarily or semi-permanently. Examples of the memory 1200 may be a hard disk drive (HDD), a solid state drive (SDD), a flash memory, a read-only memory (ROM), a random access memory (RAM), and the like. The memory 1200 may be provided in a form that is embedded in the electronic device 1000 or detachable from the electronic device 1000. The memory 1200 may store an operating system (OS) for operating the electronic device 1000, a program for operating each element of the electronic device 1000, and also various types of data required for operations of the electronic device 1000.

The processor 1300 may control overall operations of the electronic device 1000. For example, the processor 1300 may control an operation of acquiring first feature information of a server IP of a malicious website which will be described below, an operation of acquiring second feature information of a server IP of a comparative website, an operation of comparing the first feature information with the second feature information, and/or an operation of determining that the malicious website has been changed to the comparative website. Specifically, the processor 1300 may load the program for the overall operations of the electronic device 1000 from the memory 1200 and execute the loaded program. The processor 1300 may be implemented as an application processor (AP), a central processing unit (CPU), a microcontroller unit (MCU), or a similar device in association with hardware, software, or a combination thereof. As hardware, the processor 1300 may be provided in the form of an electronic circuit that performs a control function by processing an electrical signal, and as software, the processor 1300 may be provided in the form of a program or code for operating a hardware circuit.

In general, servers or harmful websites used as resources for cybercrime, such as transaction fraud, phishing, copying and sharing of copyrighted works, sharing of pornography, and more, tend to respond to IP blocking or criminal tracking by continuously changing their IPs, uniform resource locators (URLs), or the like.

Figure 2:
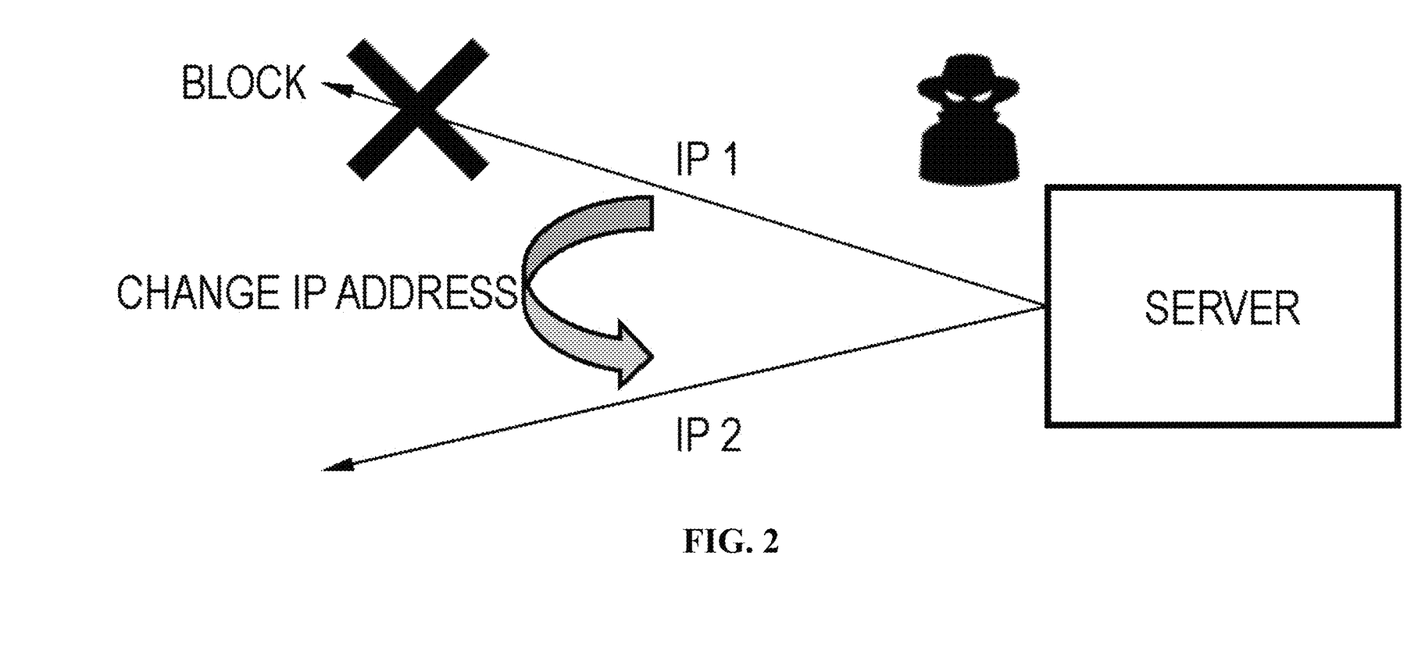
FIG. 2 is a diagram illustrating general features of malicious websites.

FIG. 2 is a diagram illustrating general features of malicious websites.

Specifically, when IPs, URLs, or the like of malicious websites which have been used are blocked (e.g., IP 1 in FIG. 2), the malicious websites tend to be used for cybercrime again by changing only IPs or URLs of the servers (e.g., changing IP 1 to IP 2 in FIG. 2) with some features of the servers maintained. Meanwhile, blocking or tracking changed malicious websites relies on reporting on changed IPs or URLs or manual work by a responsible management agency. Therefore, a new technology is required for automatically detecting a malicious website (or malicious server) using unchanged features (e.g., protocol information) of the server of the malicious website.

The electronic device 1000 according to the exemplary embodiment of the present disclosure may perform an operation of comparing feature information of the server of a malicious website which has been blocked with feature information of the server of any website and automatically determining whether the malicious website has changed to the website.

Operations of the electronic device 1000 and a method of detecting a malicious server performed by the electronic device 1000 according to exemplary embodiments of the present disclosure will be described in further detail below with reference to FIGS. 3 to 8.

Figure 3:
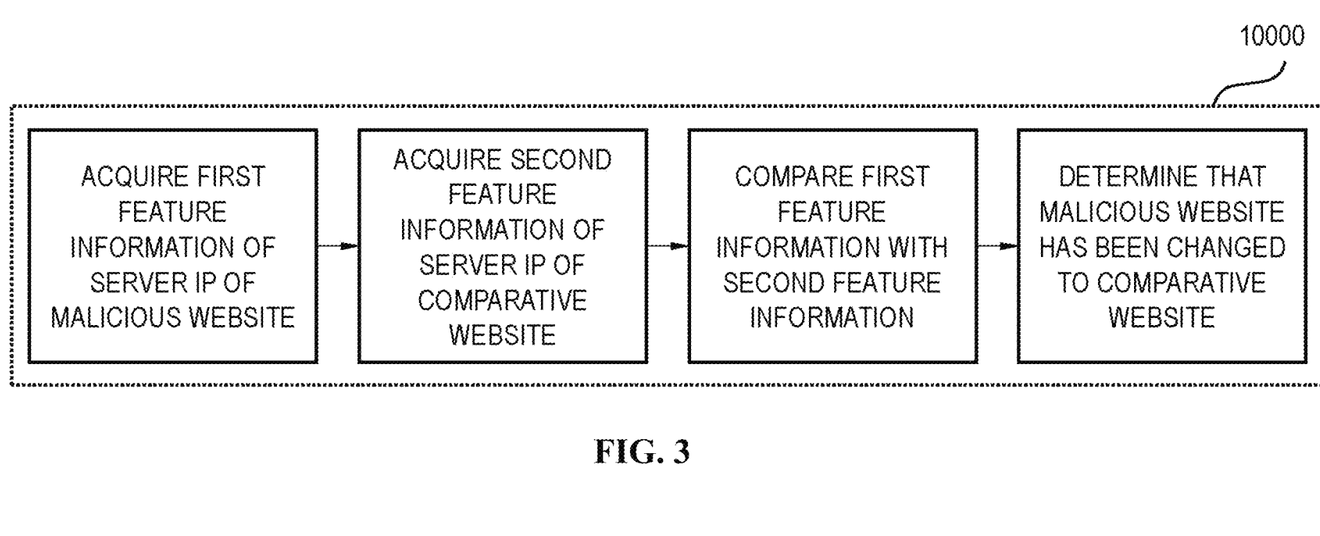
FIG. 3 is a diagram illustrating operations of the electronic device according to the exemplary embodiment of the present disclosure.

FIG. 3 is a diagram illustrating operations of the electronic device 1000 according to the exemplary embodiment of the present disclosure.

The electronic device 1000 according to the exemplary embodiment of the present disclosure may perform an operation of acquiring first feature information of a server IP of a malicious website. As an example, the first feature information of the server IP of the malicious website may be acquired in advance by analyzing a response packet from the malicious website and stored in the DB. Here, the electronic device 1000 may acquire the first feature information from the DB through the transceiver 1100. As an example, the electronic device 1000 may acquire the response packet from the malicious website, identify the header of the response packet, and extract the first feature information from data corresponding to the identified header through a parsing technique, thereby acquiring the first feature information.

The electronic device 1000 according to the exemplary embodiment of the present disclosure may perform an operation of acquiring second feature information of the server IP of a comparative website. Specifically, the electronic device 1000 may transmit a ping and/or packet to the server of the comparative website and receive a response packet from the server of the comparative website in response to the ping and/or packet.

Figure 4:
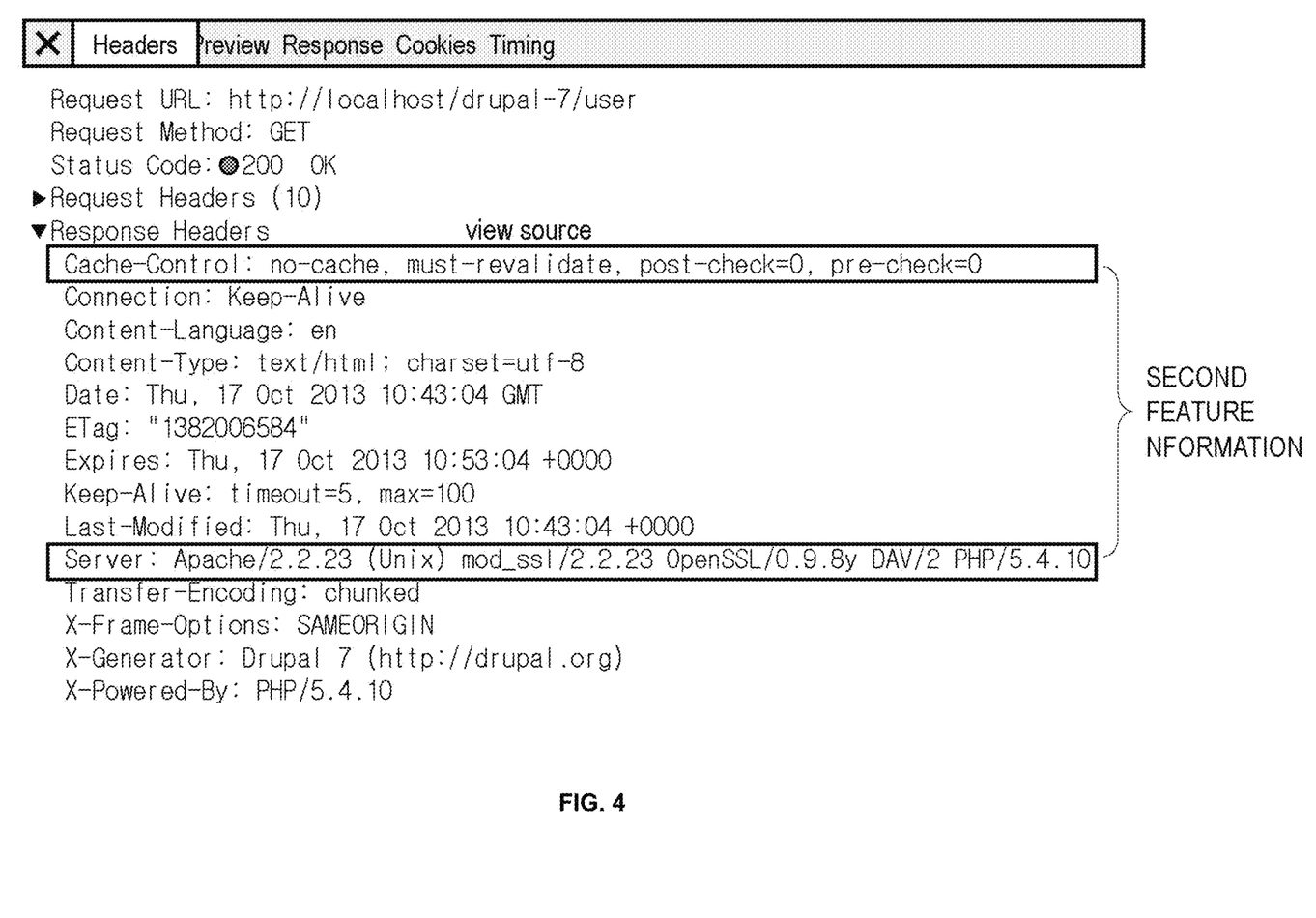
FIG. 4 is a diagram illustrating an aspect of acquiring feature information of a server Internet protocol (IP) of a comparative website according to an exemplary embodiment of the present disclosure.

FIG. 4 is a diagram illustrating an aspect of acquiring feature information of a server IP of a comparative website according to an exemplary embodiment of the present disclosure. Specifically, FIG. 4 shows an example of a response packet from a server IP of a comparative website. Here, the electronic device 1000 may identify the header of the response packet and extract second feature information of the server IP of the comparative website from data corresponding to the identified header using a parsing technique.

According to the exemplary embodiment of the present disclosure, the first feature information and the second feature information may be values are related to any protocol information, including an open network port of a server, a version of the open network port, and/or a setting value of the open network port.

Figure 5:
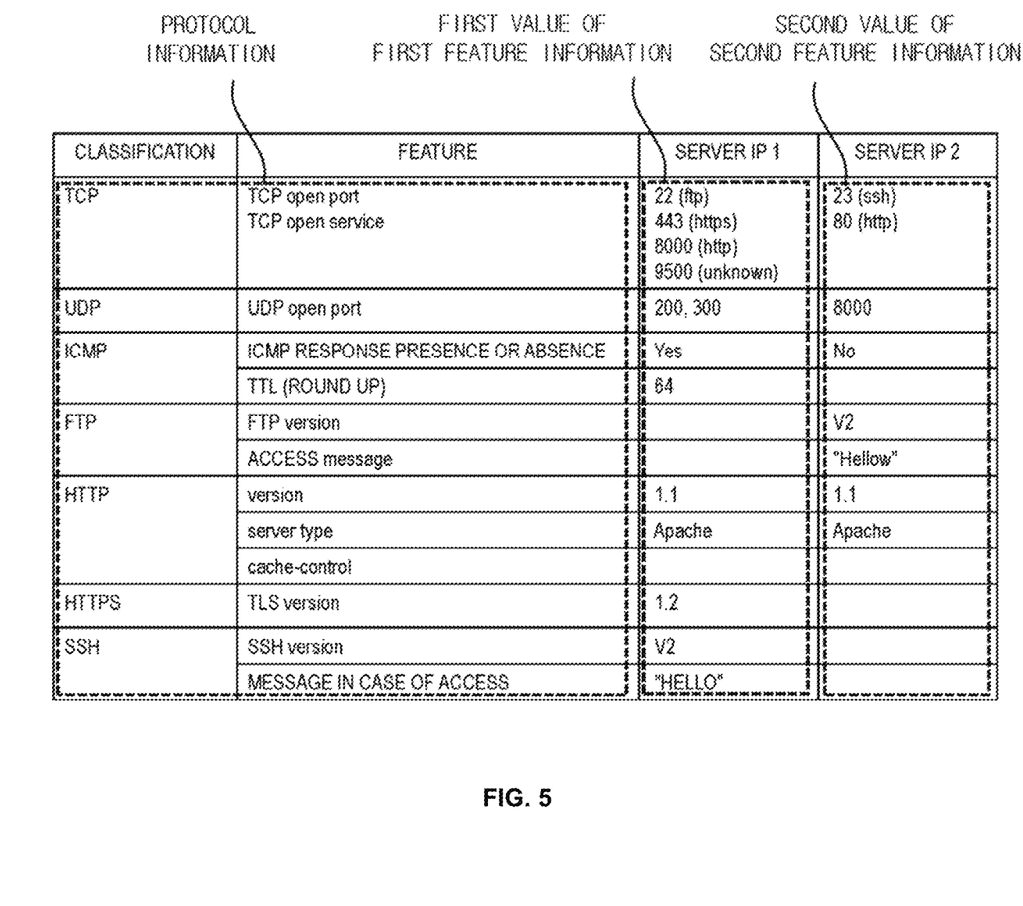
FIG. 5 is a diagram illustrating feature information of server IP according to an exemplary embodiment of the present disclosure.

FIG. 5 is a diagram illustrating examples of feature information of server IP and an aspect of comparing feature information of a server IP of a malicious website and feature information of a server IP of a comparative website according to an exemplary embodiment of the present disclosure.

As an example, first feature information and second feature information may be values related to an open port (or an assigned port) of transmission control protocol (TCP) and/or an ongoing service (or a service that is using a network port).

As an example, first feature information and second feature information may be values related to an open port of the user datagram protocol (UDP).

As an example, first feature information and second feature information may be values related to whether or not there is the Internet control message protocol (ICMP) response and/or a time to live (TTL) (the amount of time that data is set to exist in an IP header before being discarded).

As an example, first feature information and second feature information may be values related to FTP version information and/or an access message.

As an example, first feature information and second feature information may be values related to HTTP version information, a server type, cache-control, and/or content or a format of a webpage that is transmitted when the webpage is accessed.

As an example, first feature information and second feature information may be values related to transport layer security (TLS) version information in HTTPS and/or content or a format of a webpage that is transmitted when the webpage is accessed.

As an example, first feature information and second feature information may be values related to SSH version information and/or an access message.

As an example, first feature information and second feature information may be values related to Telent version information and/or a message that is transmitted when a webpage is accessed.

As an example, first feature information and second feature information may be values related to whether an application port which is frequently used as a default port in Internet services is assigned. For example, the first feature information and the second feature information may be information about whether Microsoft Structured Query Language (MSSQL) (port 1433), Oracle DB (port 1521), My SQL (MYSQL) (port 3306), Postgres (port 5432), and/or REmote DIctionary Server (REDIS) (port 6379) is assigned.

Further, the electronic device 1000 according to the exemplary embodiment of the present disclosure may perform an operation of comparing the first feature information related to a malicious website and the second feature information related to a comparative website. Specifically, the electronic device 1000 may perform an operation of comparing a first value corresponding to protocol information included in the first feature information of the malicious website with a second value corresponding to protocol information included in the second feature information of the comparative website.

For example, the electronic device 1000 may perform an operation of comparing a first value corresponding to TCP information included in the first feature information of the malicious website with a second value corresponding to TCP information included in the second feature information of the comparative website. For example, the electronic device 1000 may perform an operation of comparing a first value corresponding to UDP information included in the first feature information of the malicious website with a second value corresponding to UDP information included in the second feature information of the comparative website. For example, the electronic device 1000 may perform an operation of comparing a first value corresponding to ICMP information included in the first feature information of the malicious website with a second value corresponding to ICMP information included in the second feature information of the comparative website. For example, the electronic device 1000 may perform an operation of comparing a first value corresponding to FTP information included in the first feature information of the malicious website with a second value corresponding to FTP information included in the second feature information of the comparative website. For example, the electronic device 1000 may perform an operation of comparing a first value corresponding to HTTP information included in the first feature information of the malicious website with a second value corresponding to HTTP information included in the second feature information of the comparative website. For example, the electronic device 1000 may perform an operation of comparing a first value corresponding to HTTPS information included in the first feature information of the malicious website with a second value corresponding to HTTPS information included in the second feature information of the comparative website. For example, the electronic device 1000 may perform an operation of comparing a first value corresponding to SSH protocol information included in the first feature information of the malicious website with a second value corresponding to SSH protocol information included in the second feature information of the comparative website.

Further, the electronic device 1000 according to the exemplary embodiment of the present disclosure may perform an operation of determining that the malicious website has been changed to the comparative website. Specifically, the electronic device 1000 may determine that the malicious website has been changed to the comparative website or calculate a possibility that the malicious website has been changed to the comparative website on the basis of the comparison result between the first feature information and the second feature information.

As an example, the electronic device 1000 may calculate a similarity between the first feature information related to the malicious website and the second feature information related to the comparative website and determine the comparative website as a candidate website that is likely to be a modified website of the malicious website or determine that the malicious website has been changed to the comparative website when the calculated similarity is larger than a predetermined value.

For example, as described above, the first feature information and the second feature information may be values related to a plurality of pieces of protocol information. Here, the electronic device 1000 may calculate a similarity regarding each piece of protocol information, give a weight to each piece of protocol information, calculate an add-up similarity, and thereby determine that the malicious website has been changed to the comparative website.

Figure 6:
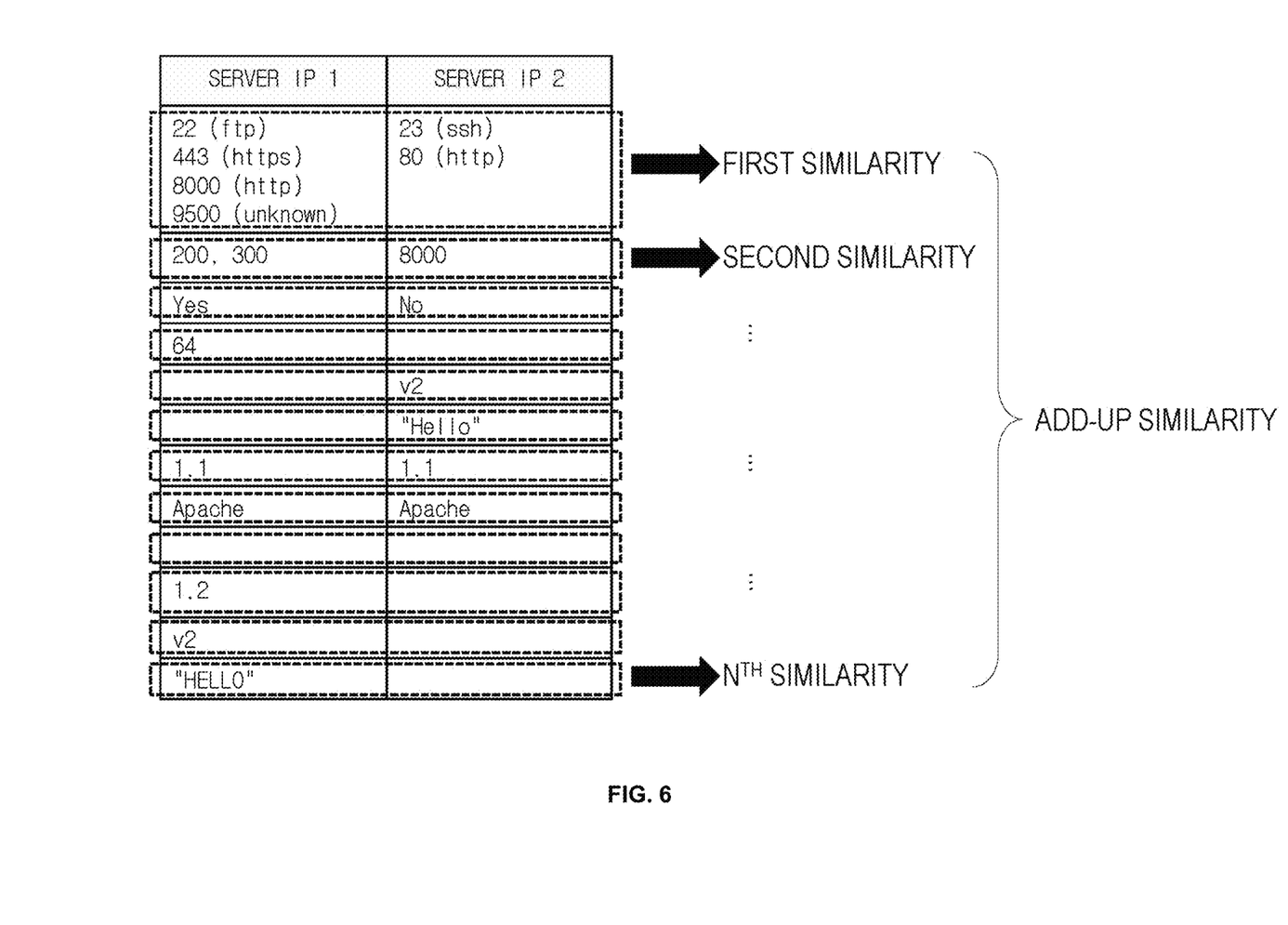
FIG. 6 is a diagram illustrating an aspect of determining that a malicious website has been changed to a comparative website according to an exemplary embodiment of the present disclosure.

FIG. 6 is a diagram illustrating an aspect of determining that a malicious website has been changed to a comparative website according to an exemplary embodiment of the present disclosure. For example, the electronic device 1000 may calculate a first similarity by comparing a first value corresponding to TCP information included in the first feature information of the malicious website with a second value corresponding to TCP information included in the second feature information of the comparative website. For example, the electronic device 1000 may calculate a second similarity by comparing a first value corresponding to UDP information included in the first feature information of the malicious website with a second value corresponding to UDP information included in the second feature information of the comparative website. For example, the electronic device 1000 may calculate a third similarity by comparing a first value corresponding to ICMP information included in the first feature information of the malicious website with a second value corresponding to ICMP information included in the second feature information of the comparative website. For example, the electronic device 1000 may calculate an $N^{th}$ similarity by comparing a first value corresponding to SSH protocol information included in the first feature information of the malicious website with a second value corresponding to SSH protocol information included in the second feature information of the comparative website.

Here, the electronic device 1000 may give a first weight to the first similarity, give a second weight to the second similarity, and give an $N^{th}$ weight to the $N^{th}$ similarity to calculate an add-up similarity. For example, values related to the UDP and/or ICMP are highly likely to be dropped in the process of transmitting response packets. Accordingly, the electronic device 1000 may be configured to calculate an add-up similarity by giving a lower weight to a similarity related to the UDP and/or ICMP compared to other similarities.

Also, the electronic device 100 may determine the comparative website as a candidate website that is likely to be a modified website of the malicious website or determine that the malicious website has been changed to the comparative website when the calculated add-up similarity is larger than a predetermined value.

Figure 7:
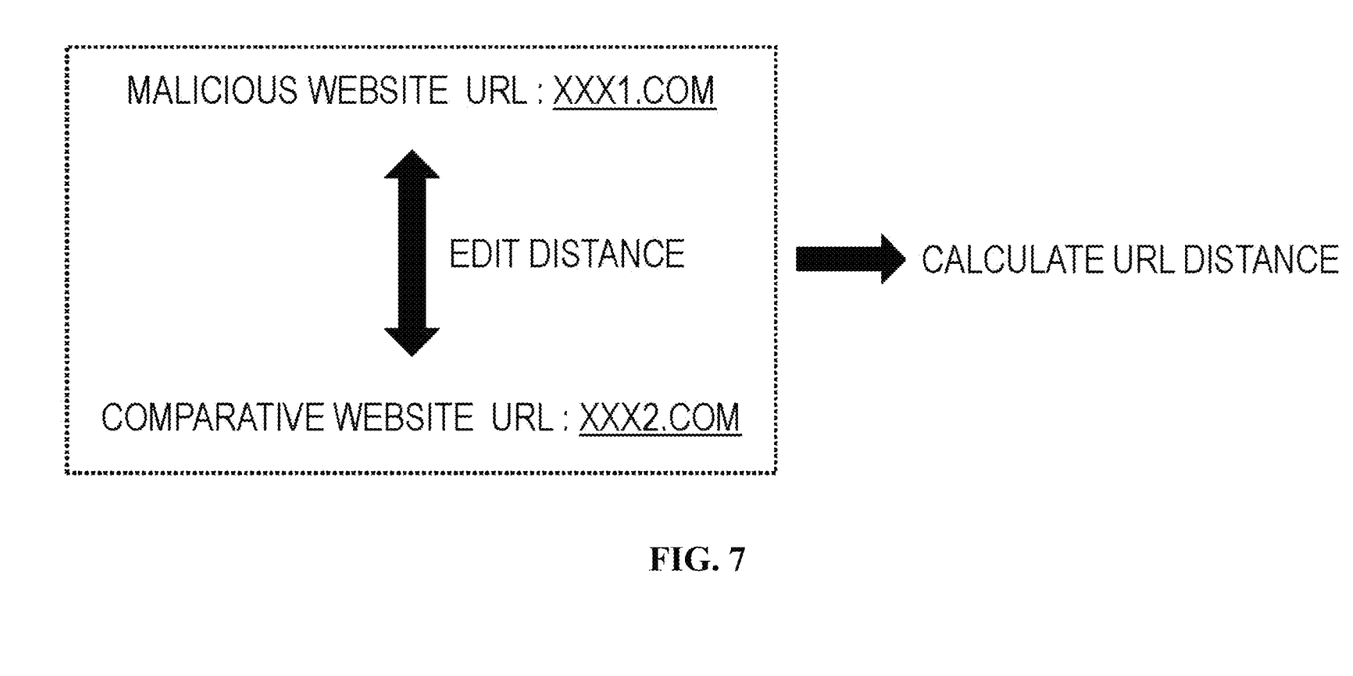
FIG. 7 is a diagram illustrating an aspect of determining that a malicious website has been changed to a comparative website according to an exemplary embodiment of the present disclosure.

Further, the electronic device 1000 according to the exemplary embodiment of the present disclosure may determine that the malicious website has been changed to the comparative website on the basis of the difference between URL information of the malicious website and URL information of the comparative website.

FIG. 7 is a diagram illustrating an aspect of determining that a malicious website has been changed to a comparative website according to an exemplary embodiment of the present disclosure.

Specifically, the electronic device may acquire URL information (e.g., XXX1.COM in FIG. 7) of a malicious website and/or URL information (e.g., XXX2.COM) of a comparative website through the transceiver 1100. Here, the electronic device 1000 may calculate the URL distance between the URL information of the malicious website and the URL information of the comparative website. For example, the electronic device 1000 may calculate the URL distance that represents the URL similarity between the URL information of the malicious website and the URL information of the comparative website using an edit distance. The edit distance may be a minimum value of an action that may be taken to compare, when two strings are given, the strings with each other and make the strings the same.

Further, the electronic device 1000 may determine that the malicious website has been changed to the comparative website on the basis of the calculated URL distance. For example, the electronic device 1000 may determine that the malicious website has been changed to the comparative website or determine the comparative website as a candidate website that is likely to be a modified website of the malicious website on the basis of the comparison result between first feature information and second feature information and/or the URL distance.

Meanwhile, to improve the accuracy in determining whether the malicious website has been changed to the comparative website, the electronic device 1000 according to the exemplary embodiment of the present disclosure may acquire and compare IP band information, IP owner information, and/or content information of each website in addition to feature information and/or URL information.

For example, the electronic device 1000 may compare the IP band information of the malicious website with the IP band information of the comparative website and determine whether the malicious website has been changed to the comparative website on the basis of the comparison result.

For example, the electronic device 1000 may compare the IP owner information of the malicious website with the IP owner information of the comparative website and determine whether the malicious website has been changed to the comparative website on the basis of the comparison result.

For example, the electronic device 1000 may compare the content information of the malicious website and the content information of the malicious website and determine whether the malicious website has been changed to the comparative website on the basis of the comparison result.

The above description is a mere example, and the electronic device 1000 may determine whether the malicious website has been changed to the comparative website by comparing any information related to the malicious website with the corresponding information related to the comparative website.

Figure 8:
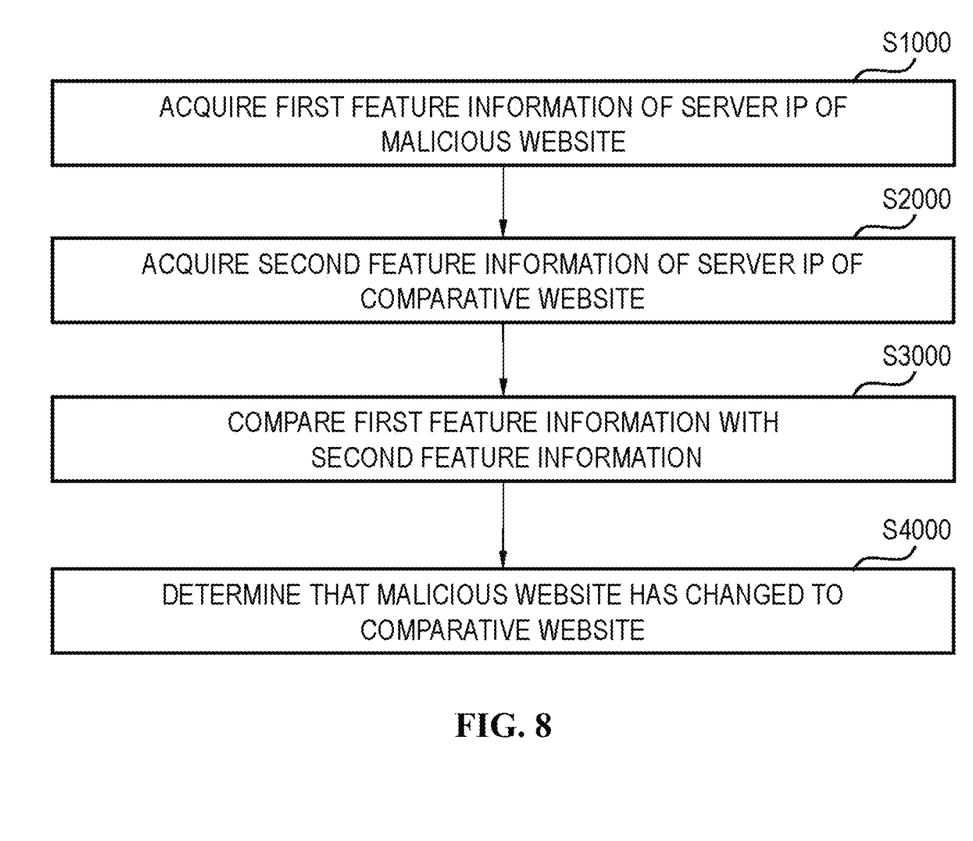
FIG. 8 is a flowchart illustrating a method of detecting a malicious server according to an exemplary embodiment of the present disclosure.

A method of detecting a malicious server according to an exemplary embodiment of the present disclosure will be described below with reference to FIG. 8. In describing the method of detecting a malicious server, the same content as described above with reference to FIGS. 3 to 7 may be omitted. However, this is only for convenience of description, and the present disclosure is not limited thereto.

The method of detecting a malicious server according to the exemplary embodiment of the present disclosure may include an operation S1000 of acquiring first feature information of a server IP of a malicious website, an operation S2000 of acquiring second feature information of a server IP of a comparative website, an operation S3000 of comparing the first feature information with the second feature information, and an operation S4000 of determining that the malicious website has been changed to the comparative website.

In the operation S1000 of acquiring first feature information of a server IP of a malicious website, the electronic device 1000 may acquire first feature information of a server IP of a malicious website.

As an example, the first feature information of the server IP of the malicious website may be acquired and stored in advance by analyzing a response packet from the malicious website. Here, the electronic device 1000 may acquire the first feature information through the transceiver 1100.

As an example, the electronic device 1000 may acquire the response packet from the malicious website, identify the header of the response packet, and extract the first feature information from data corresponding to the identified header through a parsing technique, thereby acquiring the first feature information.

In the operation S2000 of acquiring second feature information of a server IP of a comparative website, the electronic device 1000 may acquire second feature information of a server IP of a comparative website. Specifically, the electronic device 1000 may transmit a ping and/or packet to the server of the comparative website and receive a response packet from the server of the comparative website in response to the ping and/or packet. Here, the electronic device 1000 may identify the header of the response packet and extract the second feature information of the server IP of the comparative website from data corresponding to the identified header using a parsing technique. Meanwhile, as described above, the first feature information and the second feature information may be at least one of an open network port of a server, a version of the open network port, and a setting value of the open network port.

In the operation S3000 of comparing the first feature information with the second feature information, the electronic device 1000 may compare the first feature information related to the malicious website with the second feature information related to the comparative website. Specifically, the electronic device 1000 may perform an operation of comparing a first value corresponding to protocol information included in the first feature information of the malicious website with a second value corresponding to protocol information included in the second feature information of the comparative website.

In the operation S4000 of determining that the malicious website has been changed to the comparative website, the electronic device 1000 may determine that the malicious website has been changed to the comparative website or calculate a possibility that the malicious website has been changed to the comparative website on the basis of the comparison result of the operation S3000.

As an example, the electronic device 1000 may calculate a similarity between the first feature information related to the malicious website and the second feature information related to the comparative website and determine the comparative website as a candidate website that is likely to be a modified website of the malicious website or determine that the malicious website has been changed to the comparative website when the calculated similarity is larger than a predetermined value.

For example, as described above, the first feature information and the second feature information may be values related to a plurality of pieces of protocol information. Here, the electronic device 1000 may calculate a similarity regarding each piece of protocol information, give a weight to each piece of protocol information, calculate an add-up similarity, and thereby determine that the malicious website has been changed to the comparative website. Specifically, the electronic device 1000 may give a first weight to the first similarity related to first protocol information, give a second weight to the second similarity related to second protocol information, and give an $N^{th}$ weight to the $N^{th}$ similarity related to $N^{th}$ protocol information to calculate an add-up similarity. Also, when the calculated add-up similarity is larger than a predetermined value, the electronic device 100 may determine the comparative website as a candidate website that is likely to be a modified website of the malicious website or determine that the malicious website has been changed to the comparative website.

As an example, the electronic device 1000 may determine that the malicious website has been changed to the comparative website on the basis of the difference between URL information of the malicious website and URL information of the comparative website. Specifically, the electronic device 1000 may acquire the URL information of the malicious website and/or the URL information of the comparative website through the transceiver 1100. Here, the electronic device 1000 may calculate a URL distance between the URL information of the malicious website and the URL information of the comparative website by calculating an edit distance.

Further, the electronic device 1000 may determine that the malicious website has been changed to the comparative website on the basis of the calculated URL distance. For example, the electronic device 1000 may determine that the malicious website has been changed to the comparative website or determine the comparative website as a candidate website that is likely to be a modified website of the malicious website on the basis of the comparison result between the first feature information and the second feature information and/or the URL distance.

With a method of detecting a malicious server and an electronic device for performing the method according to exemplary embodiments of the present disclosure, it is possible to automatically prevent or efficiently track regeneration of malicious websites or malicious servers which are used as resources for cybercrime.

A method of detecting a malicious server and the electronic device 1000 for performing the method according to exemplary embodiments of the present disclosure may be applied to a technology for automatically preventing regeneration of malicious websites related to transaction fraud, phishing, copying and sharing of copyrighted works, and/or sharing of pornography.

Further, a method of detecting a malicious server and the electronic device 1000 for performing the method according to exemplary embodiments of the present disclosure may be applied to a technology for determining phishing websites similar to authoritative websites (e.g., financial websites, public institution websites, and the like). Specifically, a method of detecting a malicious server and the electronic device 1000 for performing the method according to exemplary embodiments of the present disclosure may be applied to a technology for comparing feature information of new websites that are similar to authoritative websites with feature information of phishing websites that are blocked in advance and determining a new website showing a certain similarity or more on the basis of the comparison result as a phishing website.

Various operations of the electronic device 1000 described above may be stored in the memory 1200 of the electronic device 1000, and the processor 1300 of the electronic device 1000 may perform the operations stored in the memory 1200.

With a method of detecting a malicious server and a device for performing the method according to exemplary embodiments of the present disclosure, it is possible to automatically prevent or efficiently track regeneration of malicious websites or malicious servers which are used as resources for cybercrime.

Effects of the present disclosure are not limited to that described above, and other effects which have not been mentioned above will be clearly understood by those skilled in the technical field to which the present disclosure pertains from the present specification and the accompanying drawings.

The features, structures, effects, and the like described in the above embodiments are included in at least one embodiment of the present disclosure and are not necessarily limited to only one embodiment. Further, features, structures, effects, and the like illustrated in each embodiment can also be implemented in combination or in a modified form according to other embodiments by those skilled in the field to which the embodiments pertain. Therefore, content related to such a combination and modification should be construed as falling within the scope of the present disclosure.

Although embodiments of the present disclosure have mainly been described, these are mere examples and do not limit the present disclosure. Those skilled in the field to which the present disclosure pertains should know that various modifications and applications not illustrated above are possible without departing from the essential characteristics of the present embodiments. In other words, each component specified in an embodiment may be implemented in a modified form. In addition, differences related to such modifications and applications should be construed as falling within the scope of the present disclosure.

What is claimed is:

1. A method of detecting a malicious server by an electronic device, the method comprising:
   acquiring first feature information of a server Internet protocol (IP) of a malicious website;
   acquiring second feature information of a server IP of a comparative website from a response packet of the comparative website;
   comparing the first feature information with the second feature information; and
   determining that the malicious website has been changed to the comparative website on the basis of a comparison result,
   wherein the first feature information includes a plurality of first pieces of protocol information of the server IP of the malicious website, and the second feature information includes a plurality of second pieces of protocol information of the server IP of the comparative website,
   wherein the determining that the malicious website has been changed to the comparative website comprises:
   calculating similarities between first values of the plurality of first pieces of protocol information included in the first feature information and second values of the plurality of second pieces of protocol information included in the second feature information, wherein the calculating of the similarities is performed by calculating a similarity between each value of the first values of the plurality of first pieces of protocol information and a corresponding value of the second values of the plurality of second pieces of protocol information with respect to a same type of protocol information among a plurality of types of protocol information;
   calculating an add-up similarity of the calculated similarities by giving different weights to the calculated similarities according to the types of protocol information, the types of protocol information being different from each other, wherein a smaller weight is given to a type of protocol information, among the plurality of types of protocol information, that is more likely to be dropped in a process of transmitting the response packet to calculate the add-up similarity; and
   determining that the malicious website has been changed to the comparative website when the add-up similarity is larger than a predetermined value.

2. The method of claim 1, wherein the determining that the malicious website has been changed to the comparative website further comprises:
   calculating a similarity between the first feature information and the second feature information; and
   when the calculated similarity is larger than a predetermined value, determining the comparative website as a candidate website that is likely to be a modified website of the malicious website.

3. The method of claim 1, wherein the protocol information includes at least one of user datagram protocol (UDP) information, Internet control message protocol (ICMP) information, file transfer protocol (FTP) information, hypertext transfer protocol (HTTP) information, hypertext transfer protocol over secure socket layer (HTTPS) information, and secure shell (SSH) protocol information.

4. The method of claim 1, wherein the determining that the malicious website has been changed to the comparative website further comprises:
   acquiring uniform resource locator (URL) information of the malicious website;
   acquiring URL information of the comparative website;
   calculating a URL distance between the URL information of the malicious website and the URL information of the comparative website by calculating an edit distance; and
   determining that the malicious website has been changed to the comparative website on the basis of the comparison result between the first feature information and the second feature information and the URL distance.

5. The method of claim 1, wherein the first feature information and the second feature information are about at least one of an open network port of a server, a version of the open network port, and a setting value of the open network port.

6. The method of claim 1, wherein the acquiring of the second feature information of the server IP of the comparative website comprises:
   acquiring the response packet of the comparative website;
   identifying a header of the response packet; and
   acquiring the second feature information from data corresponding to the identified header through a parsing technique.

7. A computer-readable recording medium including instructions for causing a computer to execute the method of claim 1.

8. An electronic device for detecting a malicious server, the electronic device comprising a processor configured to acquire first feature information of a server Internet protocol (IP) of a malicious website, acquire second feature information of a server IP of a comparative website from a response packet of the comparative website, compare the first feature information with the second feature information, and determine that the malicious website has been changed to the comparative website on the basis of a comparison result, wherein the first feature information includes a plurality of first pieces of protocol information of the server IP of the malicious website, and the second feature information includes a plurality of second pieces of protocol information of the server IP of the comparative website, wherein the processor configured to:

calculate similarities between first values of the plurality of first pieces of protocol information included in the first feature information and second values of the plurality of first pieces of protocol information included in the second feature information, wherein the calculating of the similarities is performed by calculating a similarity between each value of the first values of the plurality of first pieces of protocol information and a corresponding value of the second values of the plurality of second pieces of protocol information with respect to a same type of protocol information among a plurality of types of protocol information, calculate an add-up similarity of the calculated similarities by giving different weights to the calculated similarities according to the types of protocol information, the types of protocol information being different from each other, wherein a smaller weight is given to a type of protocol information, among the plurality of types of protocol information, that is more likely to be dropped in the process of transmitting the response packet to calculate the add-up similarity, and determine that the malicious website has been changed to the comparative website when the add-up similarity is larger than a predetermined value.

* * * * *